(12) United States Patent
Rosemeier et al.

(10) Patent No.: US 11,524,765 B2
(45) Date of Patent: Dec. 13, 2022

(54) DEVICE FOR STRUCTURE TESTING

(71) Applicant: Fraunhofer-Gesellschaft zur Förderung der angewandten Forschung e.V., Munich (DE)

(72) Inventors: Malo Rosemeier, Bremen (DE); Alexandros Antoniou, Bremerhaven (DE)

(73) Assignee: Fraunhofer-Gesellschaft zur Förderung der angewandten Forschung e.V., Munich (DE)

(*) Notice: Subject to any disclaimer, the term of this patent is extended or adjusted under 35 U.S.C. 154(b) by 153 days.

(21) Appl. No.: 16/761,179

(22) PCT Filed: Nov. 2, 2018

(86) PCT No.: PCT/EP2018/080062
§ 371 (c)(1),
(2) Date: May 1, 2020

(87) PCT Pub. No.: WO2019/086636
PCT Pub. Date: May 9, 2019

(65) Prior Publication Data
US 2020/0255121 A1  Aug. 13, 2020

(30) Foreign Application Priority Data
Nov. 3, 2017 (DE) .................... 10 2017 219 592.4

(51) Int. Cl.
*G01M 5/00* (2006.01)
*F03D 17/00* (2016.01)
(Continued)

(52) U.S. Cl.
CPC ............. *B64C 11/20* (2013.01); *B64C 11/04* (2013.01); *B64C 11/30* (2013.01); *G01M 5/005* (2013.01);
(Continued)

(58) Field of Classification Search
CPC .. G01N 3/00; G01N 3/02; G01N 3/08; G01N 1/28; G01N 3/16; G01N 3/32; B64C 11/04; B64C 11/20; B64C 11/30
See application file for complete search history.

(56) References Cited

U.S. PATENT DOCUMENTS 4,137,757 A    2/1979 Kovacs
4,183,715 A *  1/1980 Ducker ................. F03D 7/0224
                                                 416/41
(Continued)

FOREIGN PATENT DOCUMENTS

CH         702812 A2    9/2011
CN      201434806 Y     3/2010
(Continued)

OTHER PUBLICATIONS

"German Application Serial No. 10 2017 219 592.4, Examination Report dated Jun. 22, 2018", (Jun. 22, 2018), 5 pgs.
(Continued)

*Primary Examiner* — Brandi N Hopkins
(74) *Attorney, Agent, or Firm* — Schwegman Lundberg & Woessner, P.A.

(57) ABSTRACT

The invention relates to a test stand comprising a support (19, 25) which is moveably connected to a wall (18, 18', 18"), a base, a frame (26) of the test stand or another part of the test stand and can be moved on a predetermined path; an actuator (22) which is connected to the support and by means of which the support (19, 25) that can be moved on the predetermined path, two clamping devices (13) respectively comprising a ball joint, wherein one of the two clamping devices (13) is seemed to the support (19, 25) and the other of the two clamping devices (13) is arranged in an axis (10) with the first of the two clamping devices (13), such that a test body (1) is clamped between the two clamping devices (13) on outer surfaces of the test body and
(Continued)

Figure 2:
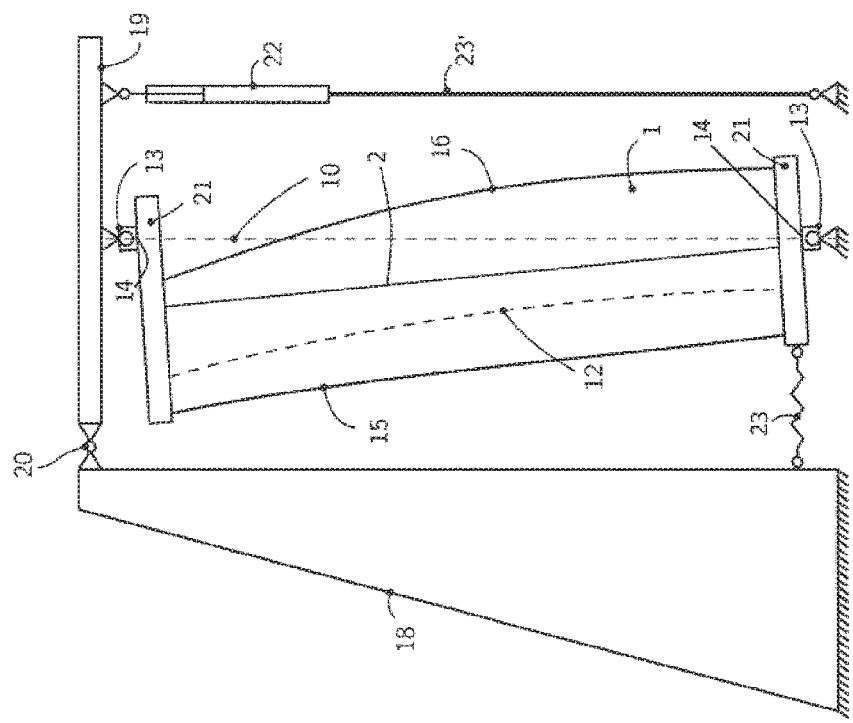

can be maintained by the clamping devices (13), and a test force exerted by a test body by moving the support (19, 25) through the first of the two clamping devices (13) acts essentially along the axis (10). The test body is fixed by means of an elastic element (23) in order to limit a rotation of the test body about the axis (10).

20 Claims, 2 Drawing Sheets

(51) Int. Cl.
  *G01N 3/08* (2006.01)
  *B64C 11/20* (2006.01)
  *B64C 11/04* (2006.01)
  *B64C 11/30* (2006.01)
  *G01N 3/04* (2006.01)
(52) U.S. Cl.
  CPC .............. *G01N 3/04* (2013.01); *G01N 3/08* (2013.01); *G01N 2203/0447* (2013.01)

(56) References Cited

U.S. PATENT DOCUMENTS

| | | | | |
|---|---|---|---|---|
| 2003/0066934 | A1* | 4/2003 | Bolonkin | Y02E 10/70 244/153 R |
| 2017/0241860 | A1* | 8/2017 | Richards | G01M 7/06 |

FOREIGN PATENT DOCUMENTS

| | | |
|---|---|---|
| CN | 204988909 | 1/2016 |
| CN | 107271283 A | 10/2017 |
| DE | 4215852 A1 | 11/1993 |
| DE | 102008048131 A1 | 4/2010 |
| EP | 2741068 | 11/2016 |
| GB | 2548589 A | 9/2017 |
| JP | 06317509 A | 11/1994 |
| JP | 09145575 A | 6/1997 |

OTHER PUBLICATIONS

"International Application No. PCT/EP2018/080062, International Search Report dated Apr. 9, 2019", w/ English Translation, (Apr. 9, 2019), 8 pgs.

"International Application No. PCT/EP2018/080062, Written Opinion dated Apr. 9, 2019", (Apr. 9, 2019), 9 pgs.

"European Application Serial No. 18 796 929.0, European Search Report dated Sep. 13, 2021", w/ English Translation, (Sep. 13, 2021), 9 pgs.

"Canadian Application Serial No. 3,081,471, Office Action dated Aug. 4, 2022", (Aug. 4, 2022), 7 pgs.

* cited by examiner

DEVICE FOR STRUCTURE TESTING

PRIORITY APPLICATIONS

This application is a U.S. National Stage Filing under 35 U.S.C. § 371 from International Application No. PCT/EP2018/080062, filed on Nov. 7, 2018, and published as WO2019/086636 on May 9, 2019, which claims the benefit of priority to German Application No. 10 2017 219 592.4, filed on Nov. 3, 2017; the benefit of priority of each of which is hereby claimed herein, and which applications and publication are hereby incorporated herein by reference in their entirety.

The invention relates to a test stand for structural testing, in particular for the structural testing of sub-components of wind energy facilities, such as components of wind energy facility rotor blades.

The rotor blades of wind energy facilities are subjected to heavy loading as well as wear during operation. The optimisation of power given a large as possible reliability represents a huge challenge with the construction of wind energy facilities and in particular with the development of rotor blades. For this, the elastic characteristics, such as the modulus of elasticity, the yield point, strength, extension at breakage, thus the loadability as well as the plastic and elastic deformability, and further structure characteristic values of the rotor blade should be known. For this, the test bodies, thus for example the components of the wind energy facility rotor blades are clamped into a test stand and loaded in tension or compression. Characteristic lines can therefore be recorded and one can determine the forces or extensions, at which a breakage or failure of the test body occurs. Due to the length of the rotor blades, which is often greater than 30 m, the testing of the blades entails a large technical effort, high-costs and is time-consuming. Making this more difficult is the complicated structure of the rotor blades. The rotor blades are often constructed in a hybrid-like manner, of several materials and/or are anisotropic, thus for example have different elastic characteristics in different spatial directions, comprise cavities, recesses and/or stiffened sections. One cannot fall back on materials tests at a general level for such test bodies since the characteristic values are highly dependent on the structure and cannot be simply calculated from the material characteristic values. The direction and point of engagement of the introduced forces play a significant role in order to realise realistic load conditions in the test procedure. Such realistic conditions in particular can be generated in sub-component tests. Herein, the sub-component tests can be carried out better and in a more controllable manner than tests of the complete blade since the dimensions of the test bodies are smaller. Computer simulation can be used in an assisting manner, but cannot replace loading test in test stands.

According to the state of the art, sub-components of wind energy facilities are measured, for example components of rotor blades with dimensions of a few metres. Several components are preferably removed at different locations of the rotor blade and are measured in test stands. Information on the behaviour of the rotor blade as a whole can be drawn from this. For this, conditions are simulated for the sub-component, said conditions corresponding to the conditions which exist when the sub-component is arranged in the rotor blade and the latter is subjected to loading. In order to achieve such a loading of the sub-component, the force introduction of a test force is effected at the ends of the sub-component at previously computed clamping locations which represent the force introduction points which are selected such that an applied loading upon the sub-component indeed corresponds to the loading which the sub-component would experience given a certain loading of the complete rotor blade.

In order to be able to accordingly load a test body and to be able to study the effects of the force action, it is important to provide a test stand which permits a test body to be clamped such that the test force can be introduced into the body at desired points of engagement and in a desired direction in an efficient and controlled manner. Furthermore, during the trial, the test body should be easily accessible and clamped such that it does not begin to rotate during the test procedure, in order to be able to better examine the effects of the force introduction. Furthermore, damaging forces upon clamping devices, with which the test bodies are clamped, should be reduced.

This is achieved by a test stand according to the independent claim 1 or 2. Advantageous embodiments result from the dependent claims.

Such a test stand comprises two clamping devices, between which the test body can be clamped at outer surfaces and by way of which a test force can be introduced. The force introduction should then be effected via the clamping devices and along an axis which connects the two clamping devices, such that a line of action of the force coincides essentially with this axis.

A test stand according to the invention comprises a carrier. The carrier is moveably connected for example to a frame of the test stand, to another part of the test stand, to a wall or to the ground. Herein, the carrier is movable on a predefined path.

The carrier is movably connected to the frame of the test stand, to the other part of the test stand, to the wall or to the ground by way of a movable connection means, such as for example rollers, plain bearings or one or more hinges or joints. The path, on which the carrier can move, is set by the respective movable connection means.

In some embodiments, the carrier is connected by way of rollers or plain bearings such that the carrier can be displaced in parallel. The predefined path is accordingly a linear path.

In other embodiments, the carrier is connected by way of one or more hinges or joints, so that the carrier can be rotated about the hinges or joints and the predefined path follows a circle or section of a circle.

The carrier is preferably designed as a beam.

An actuator, for example designed as a pneumatic, hydraulic or electrical test cylinder is connected to the carrier and can move this on its predefined path by way of the actuator either being compressed or expanded.

A first of the two clamping devices is fastened to the carrier and a second of the two clamping devices is arranged in an axis with the first of the two clamping devices, so that the test body can be damped between the two clamping devices on outer surfaces of the test body and can be held by the clamping devices. If the carrier is moved on its path by the actuator, then a test force is exerted onto the test body via the first of the two clamping devices which is fastened to the carrier. A tensile force or compressive force can be exerted, depending on whether the movement of the carrier which is effected by the actuator and hence the movement of the first of the two clamping locations is effected in the direction of the second of the two clamping locations or away from it.

In order for the test force, as stipulated above, to act essentially along the axis which connects the damping devices, thus to have a line of action which coincides with the axis, in one embodiment the carrier which is connected to the frame of the test stand by way of rollers is displaced in parallel along the axis. The carrier is preferably aligned orthogonally to the axis. In another embodiment, a beam which is fastened with a hinge to the frame, to the ground or to a wall and which in an initial position is orthogonal to the axis, is rotated about the hinge by way of the actuator, for example in the direction of the second clamping device, for producing a compressive loading.

The carrier herein typically does not essentially deviate from its initial position, so that the axis and the line of action do not essentially change during the trial.

The clamping locations, at which the clamping devices are fixed to the outer surfaces of the test body, represent the force introduction points of the test force into the test body. The test force is therefore not introduced on the outer surfaces over the complete surface, but at the clamping locations on which the clamping devices engage. The clamping devices comprise ball joints or are designed as ball joints and are therefore flexible to the extent that a twisting of the test body outer surfaces which can be entailed by a bending of the test body can be tolerated by the clamping devices.

The ball joints which are to permit a twisting of the outer surfaces which occurs in the trial, on account of the arrangement of the ball joints in one axis permit a torsion of the test body about this axis. However, a rotation, which is to say a rigid body rotation, can also occur about this axis. This rotation degree of freedom is undesirable since for example optical measuring devices which are used for measuring physical variables under load, for example for the measuring of the elongation, are not fixed on the test body and the respective value can therefore no longer be measured when the test body rotates, i.e. rotates as a rigid body. Alternative, flexible damping devices which permit a twisting of the test body outer surfaces but which have no rotation degree of freedom, such as for example cardan joints or I-beams, have been found to be disadvantageous in practice, since amongst other things they permit no torsion. Alternatively, the clamping devices which lie opposite one another can be a cardan joint and an oppositely lying ball joint. Herewith, torsion is permitted at least at one test body end.

A rotation, thus a rigid body rotation of the test body about an axis along the line of action (for example the horizontal longitudinal axis) according to the application should be restricted or prevented, but optionally a twisting perpendicular to the axis as well as torsion should continue to be possible. Herein, an elastic element, for example a spring can however substantially prevent a rotation about the longitudinal axis but permit a twisting about an axis within the plane perpendicular to the longitudinal axis. This can be accomplished by way of a suitable suspension of the elastic element.

According to the application, the test stand in some embodiments is designed such that the axis runs horizontally and the test body is clamped and loaded along the horizontal axis.

Furthermore, the rotation, thus rigid-body rotation of the test body in such a test stand can be prevented by way of gravity. It is only in the cases in which the test body is designed and clamped such that the part of the text body which lies above or below the axis have the same mass that such a horizontally clamped test body can begin to rotate spontaneously. Typically, the test bodies are clamped asymmetrically for generating a special loading, so that the test body goes into an equilibrium position, in which the mass centre of gravity lies below the axis. For this reason, a horizontal alignment is sufficient in order to prevent the rotation of the test body.

In other embodiments, the test stand can also be designed such that the axis runs vertically and the test body is accordingly clamped in an upright manner and the force is introduced vertically from above. This can be advantageous for example given certain test body dimensions, for example if a certain test body is extended less in the direction of the force introduction than in another direction. A test body which is clamped in such a manner can however begin to rotate during the trial if no further elements are provided. The application therefore suggests the provision of an elastic element, designed for example as a spring, with which the test body is connected to a frame of the test stand or to a wall, so that the rotation is prevented. The spring or the elastic element is advantageously arranged horizontally. For this, it is advantageous if the spring or the elastic element has a low as possible spring constant, so that the horizontal force which acts upon the test body due to the spring or elastic element does not entail too large damaging transverse forces upon the ball joints of the clamping devices.

The elastic element can moreover also be used with test stands having a horizontal clamping, if the test body is designed and clamped in a manner such that it can begin to rotate during the trial.

Test stands for the horizontal as well as vertical clamping of a test body according to the application are described in a detailed manner hereinafter.

In one embodiment, in which the test stand is designed to clamp the test body in an upright manner and load it vertically, the test stand comprises a frame with vertical side parts, to which the carrier which is arranged horizontally is connected by way of rollers. The carrier can then be moved in parallel up and down on account of the rollers. The first of the two clamping devices is preferably fastened centrally to the carrier. The second of the two clamping devices is fixed to the ground below the first of the two clamping devices, so that the axis runs in a precisely vertical manner between the clamping devices. In one embodiment, the actuator for moving the carrier is fastened to the carrier at the top and is connected to an upper transverse piece of the frame. If the actuator for example is expanded, the carrier is displaced in parallel downwards and exerts a compressive loading onto the test body. The actuator preferably lies in the extended axis. In one embodiment, one can also provide several actuators which are arranged symmetrically in a manner such that the carrier continues to be displaced in parallel when both actuators are simultaneously expanded or compressed. For example, two actuators can be provided, wherein these are arranged in the proximity of two opposite ends of the carrier at the same distance to the respective end of the carrier. In this embodiment, a spring or an elastic element is advantageously provided as a support, for example such that the test body is connected to the wall or to the vertical part of the test stand and cannot rotate.

In another embodiment, in which the test stand is designed to vertically clamp a test body, the carrier at one end is connected to a wall or to a vertical part of the test stand by way of a hinge. In its initial position, the carrier is aligned horizontally. The first of the two clamping devices is arranged in a middle region of the carrier, and the second of the two clamping devices is arranged on the ground, wherein the axis which connects the two clamping devices runs vertically. The actuator is advantageously fastened to the beam at the bottom in the proximity of an end of the beam which is away from the hinge, and is connected to the ground, for example via a bar. Alternatively to this, the bar can be arranged at the top and the actuator at the bottom. The test body is clamped between the wall and the vertical part of the test stand and the actuator. A compressive loading can be produced by way of compression of the actuator. Herein, the carrier acts as a lever arm. As long as the carrier is only moved slightly out of its initial position, the axis and therefore also the line of action remains substantially vertical. If the carrier deviates slightly from its initial position, then this deviation can be tolerated by the flexibly designed clamping devices. In this embodiment, a spring or an elastic element is advantageously provided as a support, for example such that the test body is connected to the wall or to the vertical part of the test stand and cannot rotate.

In a first embodiment, in which the test stand is designed to horizontally clamp a test body, the carrier is connected to the ground via the hinge and projects vertically upwards. The first of the two clamping devices is arranged in a middle region of the carrier, and the second of the two damping devices is arranged on a wall at the same height as the first of the two clamping devices. The axis then runs horizontally. The actuator is arranged at an upper end of the carrier which is away from the hinge. The actuator is fastened to the carrier at the same side as the clamping device and is connected to the wail for example via a bar. A compressive loading is exerted upon the test body by way of a compression of the actuator. The carrier here is again used as a lever arm. The test body is prevented from rotating due to the horizontal alignment. The construction can be understood as a variant of the lastly mentioned design which is rotated by 90 degrees, with a vertical alignment of the test body. In this first embodiment, the hinge can also connect the carrier to a further wall instead of to the ground.

In a second embodiment, in which the test stand is designed to horizontally clamp a test body, as in the last-mentioned embodiment the carrier is connected to the ground via the hinge and projects vertically upwards. The first of the two clamping devices is again arranged in a middle region of the carrier, and the second of the two damping devices on the wail at the same height as the first of the two clamping devices. The actuator however in contrast to the last-mentioned embodiment is fastened to the carrier at the other side just as the first of the two clamping devices and is connected to a further wall. In this embodiment, a compressive loading upon the test body is effected by way of expansion of the actuator. The distance between the further wail and the carrier can be selected such that the actuator connects the further wall and the carrier without a bar being necessary. In one variant of the second embodiment, the hinge does not connect the carrier to the ground, but to the further wall. The distance between the carrier and the further wall is then selected such that the hinge can be arranged between the carrier and the further wall. In this configuration, the distance is typically too small in order to provide an actuator between the carrier and the further wall. For this reason, the carrier is shaped such that an upper part of the carrier has a greater distance to the wall than a lower part of the carrier. For example, the carrier as an upper part comprises an offset piece which is connected to the lower part of the carrier via a horizontal or oblique element. The actuator can then be arranged between the further oval and the offset piece.

Depending on the actuator and the desired loading, the first or the second of the two aforementioned embodiments can have advantages regarding horizontal test body clamping. For example, if a compressive loading is desired and an actuator which is suitable for expanding is used, then the second embodiment is advantageous. If the actuator is designed to compress, then the first embodiment is advantageous for a compressive loading.

In the embodiments in which a hinge is provided, the carrier is utilised as a lever arm due to the arrangement of the actuator in the proximity of the end of the carrier which is away from the hinge. The force action can therefore be maximised given a predefined maximal force of the actuator. The distance of the actuator to the hinge can be varied for this purpose. The actuator car thus be adjusted to particularly favourable working regions with regard to force or displacement. An actuator with a smaller nominal force than the required test force can therefore be used for example.

In each of the aforementioned embodiments, one can further envisage the test stand comprising a digital image correlation system. The digital image correlation system is preferably designed as a 3D image correlation and comprises an optical measuring device, for instance a 3D camera system with at least two cameras. For this, the digital image correlation system can be configured to monitor or compute a deformation of the test body. Herein, an actual position of points which lie on the test body is compared to an initial position of these points. The digital image correlation is herein preferably configured to detect a rotation, i.e. rigid body rotation of the test body by at least ±5° and for example up to ±10° about an axis, about which the test body has its rotational degree of freedom. Hence it is rendered possible to tolerate this rotation. The angle of the rotation is herein to be understood as beginning from an initial resting position of the test body. For this, the cameras can be arranged such that given rotations of less than 5° or less than 10° in each direction, the points which lie on the test body continue to be detected by the cameras, The digital image correlation system can then be configured to take these rotations into account in a processing step on computing the deformation. Computed values, for instance the actual positions of the points, can accordingly be corrected whilst taking into account the rotation.

The rotations, with which the test body is deflected out of an initial rest position, thus which correspond to a rigid body rotation and are not based on a deformation of the test body, can be reduced to for example 5° or 10° by way of the shown test stand. The described correction of possibly remaining rigid body rotations is therefore advantageously rendered possible by way of the described image correlation system.

In the case of anisotropic test bodies with an inhomogeneous construction, as are present as a rule in the case of subcomponents of wind energy facilities, the elastic characteristics are different in different directions. A definition which is helpful in the context of such anisotropic test bodies relates to the centre of gravity line or elastic centre of gravity line of a body or test body. A longitudinal axis is first assigned to the test body for the definition of the centre of gravity line. The test force should be introduced along the longitudinal axis or with a component along the longitudinal axis of the test body, said component intersecting the outer surfaces. The outer surfaces can lie orthogonally to the longitudinal axis or obliquely thereto. The longitudinal axis can be arbitrarily defined and here serves as a reference axis. The longitudinal axis, for example in the case of components which originate from wind energy facility rotor blades can be defined by the straight line which is orthogonal to the flange of the rotor blades. This means that the plane of the flange, with which the rotor blades can be fastened to the hub, serves as a reference plane. Herein, the longitudinal axis can run for example through the middle point of the plane. However, another reference axis or reference surface can also be selected. A reference system which is fixed to the test body can therefore be defined.

If one were to break down the test body orthogonally to the defined longitudinal axis into infinitesimal slices, then an elastic centre of gravity can be computed for each slice. The elastic centre of gravity is defined in that a prismatic body with the cross section of the slice undergoes no bending moment if the test force engages at this centre of gravity at both sides and acts parallel to the longitudinal axis, orthogonally to the outer surfaces. Given prismatic bodies of a homogeneous material, the elastic centre of gravity is equal to the centroid (centre of gravity of an area). Inhomogeneous bodies with a modulus of elasticity which is variable over an infinitesimal plane have an elastic centre of gravity, also called ideal centre of gravity which does not correspond to the centroid, but for example is shifted towards regions of a greater elasticity. The "Lehrbuch der Technischen Mechanik-Elastostatik, Mit einer Einführung in Hybridstrukturen" (Educational book of technical mechanics-elastostatics, with an introduction to hybrid structures" by Rolf Mahnken, appearing in the Springer publishing house Berlin and Heidelberg 2015 is referred to concerning the theory of the computation of general elastic or ideal centres of gravity.

Alternatively, two elastic axes whose intersection point represents the elastic centre of gravity can also be defined for each infinitesimal slice of the test body. An elastic centre of gravity which runs through the elastic centres of gravity of each infinitesimal slice can therefore be defined for a body.

Different load conditions can be generated by way of a targeted force introduction and the selection of clamping locations. If the line of action coincides with the centre of gravity line of the test body, then no bending moment is introduced and the test body does not bend. In some cases, a bending moment is desired, and the clamping locations on the test body are selected with an eccentricity, thus at a distance, to the centre of gravity line, in order to introduce a bending moment into the test body.

In some embodiments, load introduction frames are provided on the test body outer surfaces. The load introduction frames can be for example bonded on or laminated on. The clamping locations are then no longer located directly on the test body, but on the load introduction frames, and the introduced force is introduced into the test body via the load introduction frames. By way of this, for example an undesirable deformation of the outer surfaces of the test body at the clamping locations can be prevented. A force introduction frame can comprise a plate and optionally a further construction, for example a wooden construction, wherein the test body can be bonded to the further construction.

In some embodiments, at least one of the load introduction frames can project beyond the respective outer surface, on which it is fastened, so that the clamping location can also lie outside the test body outer surface. By way of this, the eccentricity of the clamping location can be increased even further by way of the clamping location being selected such that it bears on the plate outside the outer surface of the test body.

The application further relates to the following aspects:
1. A method for use of a test stand according to the application, wherein the test body is clamped such that two clamping locations, at which the clamping devices introduce a force into the test body, have a predefined eccentricity to a centre of gravity line of the test body which is defined for a longitudinal axis of the test body and runs through elastic centres of gravity of infinitesimally thick slices which lie orthogonally to the longitudinal axis and into which the test body can be divided.
2. A method according to aspect 1, wherein plates, on which the clamping devices are fixed, are arranged on the test body outer surfaces.
3. A method for use of a test stand according to claim 2, wherein at least one of the clamping locations on a plate is selected such that the clamping location lies outside the respective outer surface on which the plate is arranged.
4. A method for use of a test stand according to one of the preceding aspects, wherein by way of providing additional material or one or more springs which is/are arranged laterally on the test body and is/are connected to the test body, for example by way of screws, bonding or laminating, the centre of gravity line of the test body is brought into a centre of gravity line of a total system of the test body and the additional material or springs.

Exemplary embodiments of test stands according to the application are shown in the figures.

Figure 1:
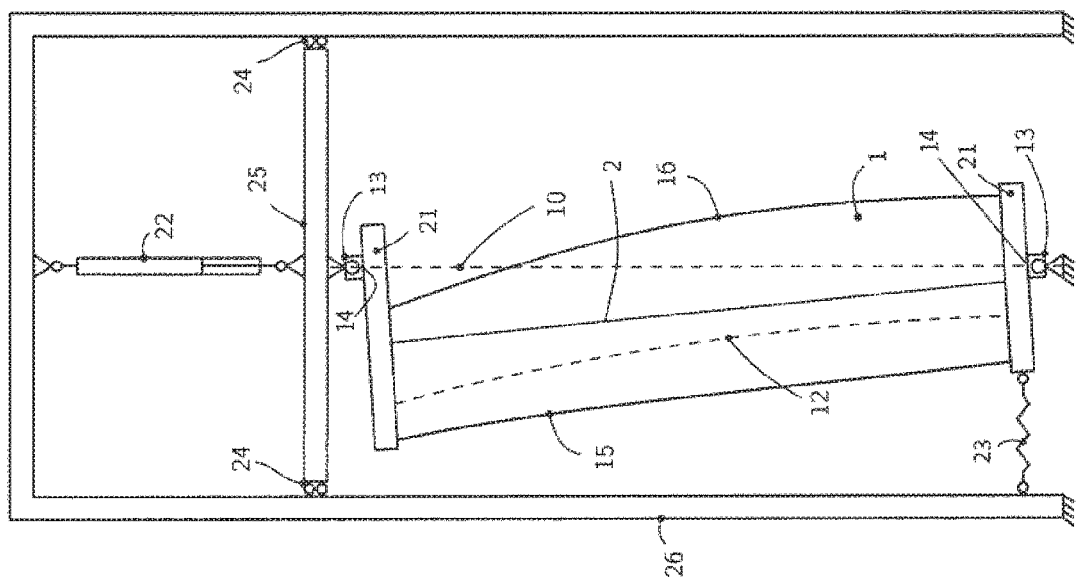
Figure 3A:
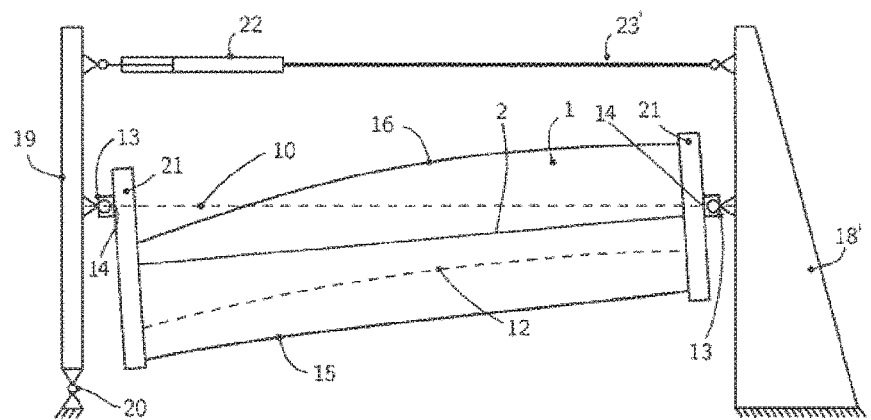
Figure 3B:
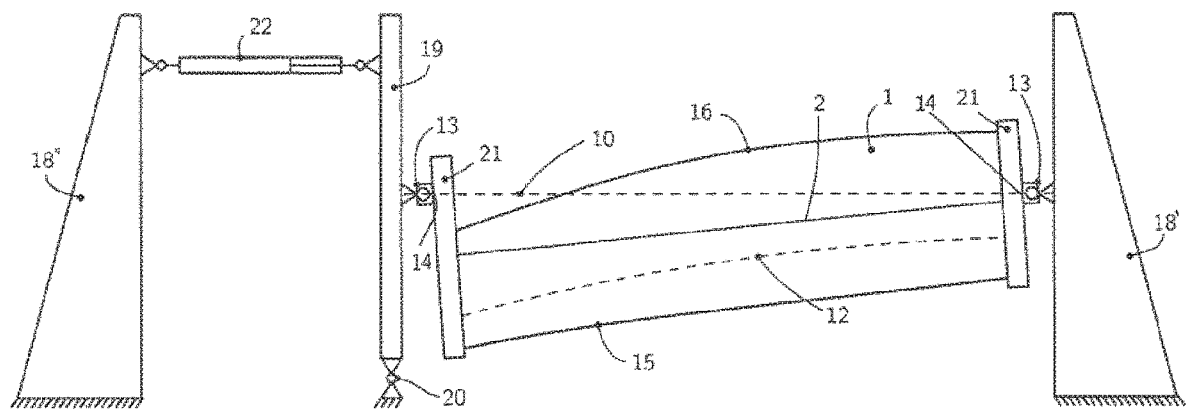
Figure 3C:
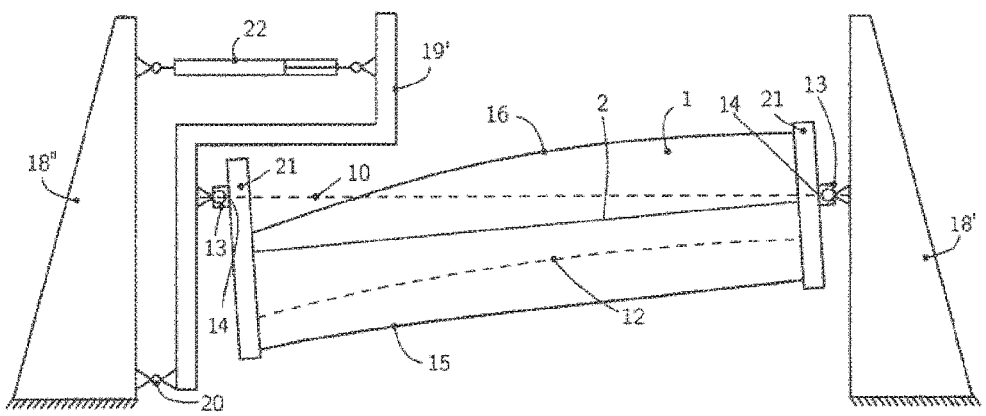

There are shown in:
FIG. 1 a test stand with rollers and a beam which can be displaced in parallel;
FIG. 2 a test stand with a hinge and with a rotationally movable beam for the vertical clamping of a test body;
FIG. 3a-c a test stand with a hinge and with a rotationally movable beam for the horizontal damping of a test body with differently arranged actuators.

FIG. 1 shows a test stand in a first embodiment. A carrier 25, designed as a beam, is arranged horizontally in a frame 26. The carrier at a first and second end of the carrier is movably connected to vertical side parts of the frame 26 by way of rollers 24 and can be displaced in parallel up and down within the frame on a fixed path. A vertically aligned actuator 22 which is connected to an upper transverse piece of the frame 26 and to the carrier 25 is designed to displace the carrier up and down in parallel on its predefined path. A test body 1 is arranged below the carrier 25. The test body is damped at two outer surfaces by way of two clamping devices 13 which are fastened at clamping locations 14 on the test body or on load introduction frames which are attached to the test body, wherein a first upper of the two clamping devices 13 is fastened to the carrier 25 and a second lower of the two damping devices 13 is fixed on the ground, so that an axis 10 which runs through the two clamping devices 13 runs vertically. The actuator 22 and the upper of the two clamping devices 13 are advantageously arranged centrally on the carrier 25 in the middle between the rollers 24. A lowering of carrier 25 is effected in the arrangement in FIG. 1 by way of expansion of the actuator 22 and a compressive loading is introduced into the test body or a lifting of the carrier 25 is effected by way of compression of the actuator 22 and therefore a tensile loading is introduced. The movement of the carrier is effected parallel to the axis 10, and by way of this a line of action of such an introduced test force coincides with the axis 10. If a test body is loaded as is shown in FIG. 1, then a second test body edge 16 deforms greater than a first test body edge on account of the relationship of the centre of gravity line 12 to the axis 10 which coincides with the line of action. The test body therefore, depending on whether a compressive or tensile loading is present, is compressed or extended more greatly at the side of the second test body edge 16 than at the side of the first test body edge 15, inasmuch as the bending stiffness and the axial stiffness are constant along the body. This results in a twisting of the test body outer surfaces to one another. The two damping devices 13 are therefore designed as ball joints, in order to be able to tolerate such a twisting of the test body outer surfaces which a bending entails. Since the flexible clamping devices 13 are ball joints, a test body 1 if it were not to be fixed further, could rotate about the axis 10. For this reason, an elastic element 23, for example designed as a spring, is provided, said elastic element connecting the test body 1 to the frame 26 and securing the test body from rotating about the axis 10. Herein, the spring can be connected to the load introduction frame 21 for example along an axis, wherein the axis runs perpendicularly out of the image plane. In this manner, a rotation about the axis 10 is prevented but a twisting perpendicularly thereto is however rendered possible. Since the necessary restoring force for preventing the rotation about the axis 10 is relatively small, a suitable spring constant, for example a small spring constant which restricts or prevents the rotation about the axis 10 but which tolerates a small twisting about for example the axis out of the image plane can be selected.

Load introduction frames 21 are advantageously arranged on the test body outer surfaces, at which the test force is introduced. These load introduction frames 21 are for example bonded to the test body outer surfaces or are laminated or screwed onto the test body outer surfaces. The clamping locations 14 then do not bear directly on the test body outer surfaces, but on the load introduction frames. By way of this, a deformation of the test body outer surfaces can be prevented by the clamping devices 13. Furthermore, the load introduction frames can project beyond the test body outer surfaces, so that the clamping locations 14 can be selected such that they lie outside the test body outer surfaces. A centre of gravity line 12 of the test body 1 is defined for a longitudinal axis 2 of the test body 1 and runs through elastic centres of gravity of infinitesimally thick discs (slices), into which the test body can be divided and which lie orthogonally to the longitudinal axis 2. The line of action which runs along the axis 10 has an eccentricity to the centre of gravity line 12. By way of this, a bending moment is introduced into the test body 1. A first test body edge 15 in the present example of constant stiffnesses (see above) is deformed to a lesser extent than a second test body edge 16. Due to the fact that the clamping locations 14 bear on load introduction frames 21, the clamping locations 14 can lie outside the test body outer surfaces, in order to yet further increase the eccentricity. In the example which is shown in FIG. 1, the upper of the two clamping locations 14 is selected such that it lies outside the upper test body outer surface, so that a particularly large bending moment is introduced at the top, wherein the eccentricity of the lower of the two clamping locations 14 is low, so that the bending moment becomes continuously larger from the bottom to the top. The test body 1 is therefore accordingly tilted, in order to achieve a desired eccentricity at the top and bottom. Different loadings can be achieved by way of this. The construction which is shown in FIG. 1 can also be modified such that several actuators can be applied instead of or additionally to the one actuator 22. The actuators are advantageously arranged such that the carrier 25 is loaded in a uniformly symmetrical manner. For example, two additional actuators which are arranged to the right and left of the actuator 22 at the same distance are used. The actuator at its ends can be fixedly clamped or clamped via joints. In the case of joints, occurring angular deviations of the actuator axis from the axis 10 can be compensated. The beam 25 is preferably horizontal.

FIG. 2 shows a test stand, concerning which in contrast to the test stand which is shown in FIG. 1 no circumventing frame is shown. A beam 19 here is again arranged horizontally and is fixed with a hinge 20 to a wall 18. The carrier 19 at a side which is away from the wall 18 and the hinge 20 is connected to an actuator 22 which via a bar 23' is connected to the ground and is designed to move the carrier 19 about the hinge 20 on a circular path out of the horizontal. As is FIG. 1, the test body 1 is clamped at two outer surfaces by way of two clamping devices 13 which are designed as ball joints, and the first, upper of the two clamping devices 13 is fixed to the carrier 19 and the second, lower of the two clamping devices 13 is fixed on the ground. The test body 1 is therefore arranged parallel to the actuator 22. Here therefore a compression loading is introduced into the test body for example by way of compression of the actuator 22, or a tensile loading by way of expansion. In an initial state, the axis 10 which runs through the two clamping devices 13 runs vertically. The test body 1 just as in the example which is shown in FIG. 1 can be clamped by way of load introduction frames 21 and via an elastic element 23 or a spring can be connected to the wall 18 and is prevented from rotating. The eccentricities can be selected as in the example of FIG. 1, but here however a lever arm can be utilised due to the arrangement of the actuator, so that a higher test force can be applied. A typical test body 1 is herein not deformed to such an extent that the carrier moves significantly out of the horizontal. The line of action and the axis 10 remain substantially in the horizontal.

FIG. 3a shows a test stand, which is constructed similarly to the test stand of FIG. 2, concerning which however the axis 10 through the two clamping devices 13 runs horizontally in contrast to the configuration of FIG. 2. The hinge 20, about which the carrier 19 can be rotated, is now arranged on the ground, and the actuator which can move the carrier 19 on the respective path is connected to the wail 18' via the bar 23', wherein the test body 1 can be clamped parallel to the actuator 22 horizontally between the carrier 19 and the wall 18' by way of clamping devices 13 being arranged on the carrier 19 and on the wall 18', so that the axis 10 through the clamping devices now runs horizontally. The eccentricities of the axis 10 to the centre of gravity line of the test body 1 can be adjusted again at both ends of the test body 1 by way of respective tilting. The gravitational force can ensure that the test body assumes a stable position and does not rotate during the test procedure. Since the test bodies are typically asymmetrical and/or are clamped in an oblique manner, a potential minimum results for precisely one position of the test body.

The test stand further comprises a digital image correlation system which is designed as a 3D image correlation and an optical measuring device with two cameras. The digital image correlation system is configured for monitoring or computing a deformation of the test body. Herein, an actual position of points lying on the test body is compared to an initial position of these points. The digital image correlation system is herein configured to detect a rotation, i.e. rigid body rotation, of the test body, starting from its initial rest position, of at least ±5° and for example up to ±10° about the axis, about which the test body has its rotation degree of freedom and hence to tolerate this. Such deflections are typically permanent deflections which are down to the rotation degree of freedom which exists with the shown device. Greater deflections are herein advantageously prevented by the shown arrangement. For this, the cameras are arranged such that on rotation of less than 5° or less than 10° in each direction, the points which lie on the test body continue to be detected by the cameras. The digital image correlation system is configured to take into account these rotations, thus rigid body rotations, in a processing step on computing the deformation and to accordingly correct computed values. This means that given a monitoring of the actual positions of the points, point movements which are to be assigned to the rigid body rotation are identified as such and are subsequently computed out. Relative point movements which are of relevance to the deformation, thus for instance the torsion, compression or elongation of the test body are therefore extracted. This image correlation system can also be applied with any other of the test stands which are shown in the FIGS. 1 to 3*c*.

FIG. 3*b* shows a variant of the example of FIG. 3*a*, wherein the actuator 22 however is not arranged between the carrier 19 and the wall 18' parallel to the test body 1, but on the other side of the carrier 19 and is connected there to a further wall 18". Here, a tensile loading is achieved by way of this arrangement given a compression of the actuator 22 and a compressive loading by way of expansion of the actuator 22. As in FIG. 2, a lever arm can also be advantageously utilised in this variant. Since the distance between the carrier 19 and the further wall 18" can be less than the length of the test body, in this embodiment one can make do without a bar with which the actuator 22 is connected to the further wall 18" or to the carrier 19.

FIG. 3*c* shows a variant of the example which is shown in FIG. 3*b*, Here, the carrier is designed as a carrier 19' with an offset piece which is shaped such that a lower part of the carrier 19' and an upper part of the carrier 19' are offset to one another and are connected by a horizontal element. By way of this, the lower part of the carrier 19' can be arranged closer to the further wall 18' than the carrier 19 in the example of FIG. 3*b*, and the hinge 20 can connect the carrier 19' to the further wall 18" instead of to the ground. Due to the fact that the upper part is offset in the direction of the test body 1, the actuator 22 has space between the carrier 19' with the offset piece in the upper region and the further wall 18". The test stand as a whole is therefore smaller and is more space-saving than in the embodiment of FIG. 3*b*.

LIST OF REFERENCE NUMERALS

1 test body
2 longitudinal axis
10 line of action
12 centre of gravity line
13 clamping device with ball joint
14 clamping location
15 first test body edge
16 second test body edge
18 wall
18' wall
18" wall
19 carrier
19' carrier with offset piece
20 hinge
21 load introduction frame
22 actuator
23 elastic element
23' bar
24 rollers
25 carrier
26 frame

The invention claimed is:

1. A test stand for use in an environment including a wall and a around, the test stand comprising:
a frame; and
a carrier configured for being movably connected to at least one of the wall and the ground and; the frame, and wherein the carrier is movable on a predefined path;
an actuator connected to the carrier, to cause the carrier to move on the predefined path; and
a first clamping device and a second clamping device, wherein at least one of the first clamping device and the second clamping device includes a ball joint, wherein one of the first clamping device or the second clamping device is fastened to the carrier and the other of the first clamping device or the second clamping device is arranged in an axis with the one of the first clamping device or the second clamping device fastened to the carrier, such that between the first clamping device and the second clamping device a test body is connected at an outer surface of the test body using the first clamping device and the second clamping device and a test force is exerted onto the test body by moving the carrier, wherein the test force acts along the axis, and wherein the test body is fixed by an elastic element to limit a rotation of the test body about the axis.

2. The test stand according to claim 1, wherein the carrier is movably connected to the wall, the ground, the frame of the test stand by using one or more of, a roller, a bearing, a hinge, or a joint, and wherein the predefined path of the carrier is set by the one or more of the roller, the bearing, the hinge, or the joint.

3. The test stand according to claim 2, wherein the actuator is located, and the carrier is movably connected by one or more of, the hinge or the joint, so that the movement of the carrier on the predefined path includes a rotation about the hinge or the joint.

4. The test stand according to claim 3, wherein the actuator is located on a same side of the carrier as the one of the first clamping device or the second clamping device fastened to the carrier.

5. The test stand according to claim 3, wherein the actuator is located on a different side of the carrier than the one of the first clamping device or the second clamping device fastened to the carrier.

6. The test stand according to claim 3, wherein the hinge is located at a first end of the carrier and the actuator is located at a second end of the carrier, the second end of the carrier being located opposite to or away from the first end.

7. The test stand according to claim 1, wherein the carrier is includes a beam.

8. The test stand according to claim 1, wherein the actuator is located, and the carrier is movable, so that the movement of the carrier on the predefined path includes a parallel displacement of the carrier.

9. The test stand according to claim 1, wherein the actuator includes one or more of, a pneumatic cylinder, a hydraulic cylinder, or an electrical cylinder.

10. The test stand according to claim 1, wherein the elastic element includes a spring.

11. The test stand according to claim 1, wherein load introduction frame is located between the first clamping device, the second clamping device, and the outer surface of the test body.

12. The test stand according to claim 1, in combination with, a digital image correlation system which is configured to monitor and calculate a deformation of the test body, wherein the digital image correlation system is further configured to detect the rotation of the test body about the axis and use a measurement of the rotation in the calculation of the deformation.

13. A test stand for use in an environment including a wall and a ground the test stand comprising:
 a frame; and
 a carrier configured for being movably connected to at least one of the wall and the ground and the frame, and wherein the carrier is movable on a predefined path;
 an actuator connected to the carrier, to cause the carrier to move on the predefined path; and
 a first clamping device and a second clamping device wherein at least one of the first clamping device and the second clamping device includes a ball joint, wherein one of the first clamping device or the second clamping device is fastened to the carrier, and the other of the first clamping device or the second clamping device is arranged in an axis with the one of the first clamping device or the second clamping device fastened to the carrier, such that between the first clamping device and the second clamping device a test body is connected at an outer surface of the test bod using the first clamping device and the second clamping device and a test force is exerted onto the test body by moving the carrier, wherein the test force acts along the axis, and wherein the axis is arranged horizontally.

14. The test stand according to claim 13, wherein the carrier includes a beam.

15. The test stand according to claim 13, wherein the actuator includes one or more of, a pneumatic cylinder, a hydraulic cylinder, or an electrical cylinder.

16. The test stand according to claim 13, in combination with a digital image correlation system which is configured to monitor and calculate a deformation of the test body, wherein the digital image correlation system is further configured to detect a rotation of the test body about the axis, and use a measurement of the rotation of the test body about the axis in the calculation of the deformation.

17. The test stand according to claim 13, wherein the carrier is movably connected to the wall, the ground, the frame of the test stand using one or more of, a roller, a bearing, a hinge, or a joint, and wherein the predefined path of the carrier is set by the one or more of, the roller, the bearing; the hinge, or the joint.

18. The test stand according to claim 17, wherein the actuator is located, and the carrier is movably connected by one or more of, the hinge, or the joint so that the movement of the carrier on the predefined path includes a rotation about the one or more of the hinge or the joint.

19. The test stand according to claim 18, wherein the actuator is located on a same side of the carrier as the one of the first clamping device or the second clamping device fastened to the carrier.

20. The test stand according to claim 18, wherein the actuator is located on a different side of the carrier than the one of the first clamping device or the second clamping device fastened to the carrier.

* * * * *